(12) United States Patent
Kado

(10) Patent No.: US 6,683,879 B1
(45) Date of Patent: Jan. 27, 2004

(54) COLLISION CONTROL CIRCUIT IN ATM EXCHANGE

(75) Inventor: Youiti Kado, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/258,370

(22) Filed: Feb. 26, 1999

(30) Foreign Application Priority Data

Feb. 27, 1998 (JP) .......................................... 10-046895

(51) Int. Cl.[7] .............................................. H04L 12/56
(52) U.S. Cl. ..................................... 370/395.4; 370/412
(58) Field of Search ................................. 370/229, 230, 370/252, 236, 395.43, 395.7, 412–418, 395.42, 468, 395.3, 233, 232, 395.4, 395.71

(56) References Cited

U.S. PATENT DOCUMENTS

| | | | | | |
|---|---|---|---|---|---|
| 5,533,020 | A | * | 7/1996 | Byrn et al. .............. | 370/395.4 |
| 5,757,771 | A | * | 5/1998 | Li et al. .................. | 370/418 |
| 5,774,453 | A | * | 6/1998 | Fukano et al. ........... | 370/414 |
| 5,818,818 | A | * | 10/1998 | Soumiya et al. .......... | 370/252 |
| 5,909,443 | A | * | 6/1999 | Fichou et al. ............ | 370/414 |
| 5,917,804 | A | * | 6/1999 | Shah et al. ............... | 370/230 |
| 5,983,278 | A | * | 11/1999 | Chong et al. ............. | 370/444 |
| 5,991,295 | A | * | 11/1999 | Tout et al. ............... | 370/395.7 |
| 6,009,078 | A | * | 12/1999 | Sato ....................... | 370/232 |
| 6,011,779 | A | * | 1/2000 | Wills ...................... | 370/413 |
| 6,137,779 | A | * | 10/2000 | Miller et al. ............. | 370/236 |
| 6,157,614 | A | * | 12/2000 | Pasternak et al. ......... | 370/236 |
| 6,198,724 | B1 | * | 3/2001 | Lam et al. ................ | 370/412 |
| 6,229,789 | B1 | * | 5/2001 | Simpson et al. ........... | 370/418 |
| 6,229,812 | B1 | * | 5/2001 | Parruck et al. ........... | 370/395.71 |
| 6,359,862 | B1 | * | 3/2002 | Jeffries et al. ........... | 370/395.43 |

FOREIGN PATENT DOCUMENTS

| | | |
|---|---|---|
| JP | 7-327033 | 12/1995 |
| JP | 9-139741 | 5/1997 |

* cited by examiner

Primary Examiner—Steven H. D Nguyen
Assistant Examiner—Phuongchau Ba Nguyen
(74) Attorney, Agent, or Firm—Venable LLP; Michael A. Sartori

(57) ABSTRACT

The ATM exchanges that a plurality of connections are established and a plurality of processes with respect to the plurality of connections having each having a transmission rate arise, the ATM exchange comprising a priority computing circuit which computes a priority of a process, according to a updating frequency of priority assigned to a connection to which the process is associated, a priority comparing circuit which compares a plurality of priorities corresponding to the plurality of processes to select a process having a higher priority among the plurality of processes, and a processing circuit which carries out the selected process.

8 Claims, 8 Drawing Sheets

Fig. 3

| TRANSMISSION RATE | ADDITIONAL VALUE |
|---|---|
| 1≦RATE<4 | 1 |
| 4≦RATE<16 | 4 |
| 16≦RATE<64 | 16 |
| 64≦RATE<256 | 64 |
| 256≦RATE<1024 | 256 |

Fig. 4

| TRANSMISSION RATE | ADDITIONAL VALUE |
|---|---|
| 1≦RATE<4 | 1/UPDATING FREQUENCY |
| 4≦RATE<16 | 4/UPDATING FREQUENCY |
| 16≦RATE<64 | 16/UPDATING FREQUENCY |
| 64≦RATE<256 | 64/UPDATING FREQUENCY |
| 256≦RATE<1024 | 256/UPDATING FREQUENCY |

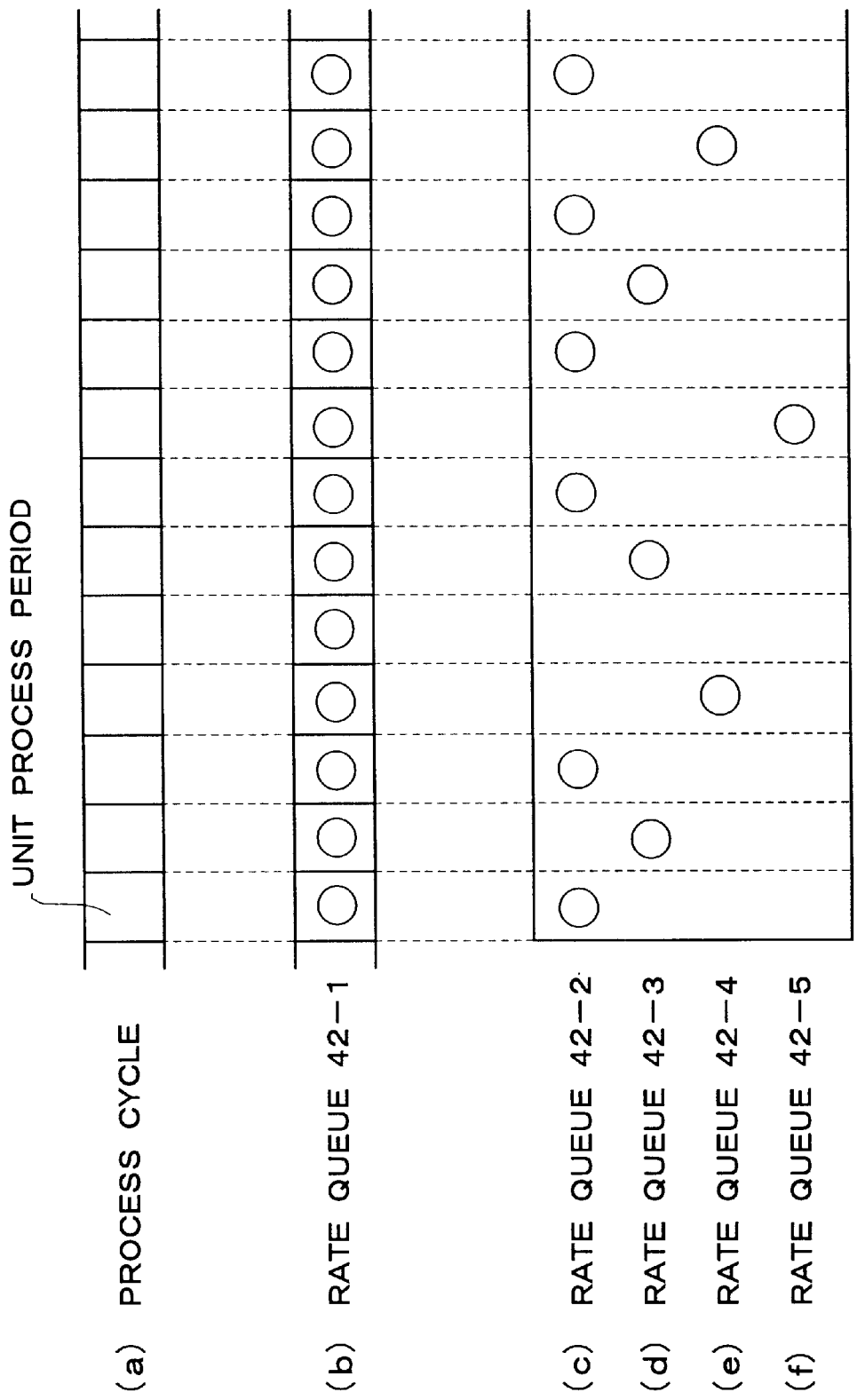

COLLISION CONTROL CIRCUIT IN ATM EXCHANGE

BACKGROUND OF THE INVENTION

1. Field of the Invention

The present invention relates to a collision control circuit for controlling a collision among processes or requests with respect to connections in an ATM (Asynchronous Transfer Mode) exchange, and in particular to a control circuit which manages timing of performing the processes.

2. Description of the Related Art

There has been a typical ATM exchange that accommodates a plurality of connections, in which cells pass along the plurality of connections, asynchronizing with each other. Since the transmission rates of the connections differ from each other and there randomly pass cells along the connections, the processes with respect to the cells or the connections arise at random.

In general, the frequency of processing cells passing through a connection is proportional to the transmission rate of the connection. Since the transmission rate of the connection is finite, the frequency of processing the cells is also finite. This gives a possibility of multiplexing in a unit process period for transmitting cells, processes of a plurality of cells. Herein, the unit process period is defined as the minimum period of time that the ATM exchange is capable of handling or manipulating with respect to processing cells, as shown in FIG. 9.

For multiplexing the processes for cells, Japanese patent laid-open publication No. 7-327033 and No. 9-139741 have taught several multiplexing methods to manage cells passing through a plurality of connections. According to the methods, processes of the cells are registered into a time table, in which the processes are successively implemented pursuant to the time table.

As another multiplexing method, there has been a well-known method called round-robin, which alters the priorities of the processes. Pursuant to this method, processes of cells coming through connections having larger transmission rates require much time for completion of execution. Waiting time for the processes for the cells all of which come via a connection do not depend upon the transmission rate of the connection. Therefore, connections having larger transmission rates more decrease in throughput due to waiting time.

Using the arts described above, the processes with respect to the connections having large transmission rates decline in priority. Therefore, it is difficult to maintain or not to deteriorate the throughput of the connections having larger transmission rates in such an ATM exchange that also accommodates a number of connections each having lower transmission rates.

SUMMARY OF THE INVENTION

It is therefore an object of the present invention to provide a collision control circuit for use in an ATM exchange which is capable of maintaining the transmission rates of connections having larger transmission rates.

According to one aspect of the present invention, there is provided an ATM exchange in which a plurality of connections are established and a plurality of processes with respect to the plurality of connections each having a transmission rate arise, the ATM exchange comprising: a priority computing circuit which computes a priority of a process, according to a transmission rate assigned a connection to which the process is associated; a priority comparing circuit which compares a plurality of priorities corresponding to the plurality of processes to select a process having a higher priority among the plurality of processes; and a processing circuit which carries out the selected process.

According to another aspect of the present invention, there is provided an ATM exchange in which a plurality of connections are established and a plurality of processes with respect to the plurality of connections each having a transmission rate arise, the ATM exchange comprising: a priority computing circuit which computes a priority of a process, according to an updating frequency of priority assigned to a connection to which the process is associated; a priority comparing circuit which compares a plurality of priorities corresponding to the plurality of processes to select a process having a higher priority among the plurality of processes; and a processing circuit which carries out the selected process.

According to still another aspect of the present invention, there is provided an ATM exchange in which a plurality of connections are established and a plurality of processes with respect to the plurality of connections each having a transmission rate arise, the ATM exchange comprising: a plurality of queues which each register processes; a priority computing circuit which computes a priority of a process, according to the sum of a plurality of transmission rates assigned to connections associated with the registered processes; a priority comparing circuit which compares a plurality of priorities corresponding to the plurality of processes to select a process having a higher priority among the plurality of processes; and a processing circuit which carries out the selected process.

According to a further aspect of the present invention, there is provided an ATM exchange in which a plurality of connections are established and a plurality of processes with respect to the plurality of connections each having a transmission rate arise, the ATM exchange comprising: a plurality of queues which each register processes; a priority computing circuit which computes a priority of a process, according to the number of the registered processes; a priority comparing circuit which compares a plurality of priorities corresponding to the plurality of processes to select a process having a higher priority among the plurality of processes; and a processing circuit which carries out the selected process.

According to still another aspect of the present invention, there is provided an ATM exchange in which a plurality of connections are established and a plurality of processes with respect to the plurality of connections each having a transmission rate arise, the ATM exchange comprising: a plurality of queues which each register processes; a priority computing circuit which computes a priority of a process, according to the weight assigned to the queue registering the processes; a priority comparing circuit which compares a plurality of priorities corresponding to the plurality of processes to select a process having a higher priority among the plurality of processes; and a processing circuit which carries out the selected process.

According to yet a further aspect of the present invention, there is provided an ATM exchange in which a plurality of connections are established and a plurality of processes with respect to the plurality of connections each having a transmission rate arise, the ATM exchange comprising: a plurality of queues which register processes; a control circuit which selects a process having a higher priority among the plurality of processes, pursuant to a pattern indicating the order of the plurality of processes regulated on the basis of the transmission rates of the plurality of queues.

BRIEF EXPLANATION OF THE DRAWINGS

The present invention will be understood more fully from the detailed description given hereinbelow, taken in conjunction with the accompanying drawings.

FIG. 3 is a block diagram showing the table according to the first embodiment;

FIG. 4 is a block diagram showing the table according to the second embodiment;

FIG. 9 is a pattern which shows timing of updating priorities according to the seventh embodiment.

DESCRIPTION OF THE PREFERRED EMBODIMENTS

The preferred embodiments of the collision control circuit for controlling collisions in an ATM exchange according to the present invention will be now described hereinafter. Prior to description of each embodiment, the configuration of the ATM exchange will be discussed first.

Figure 1:
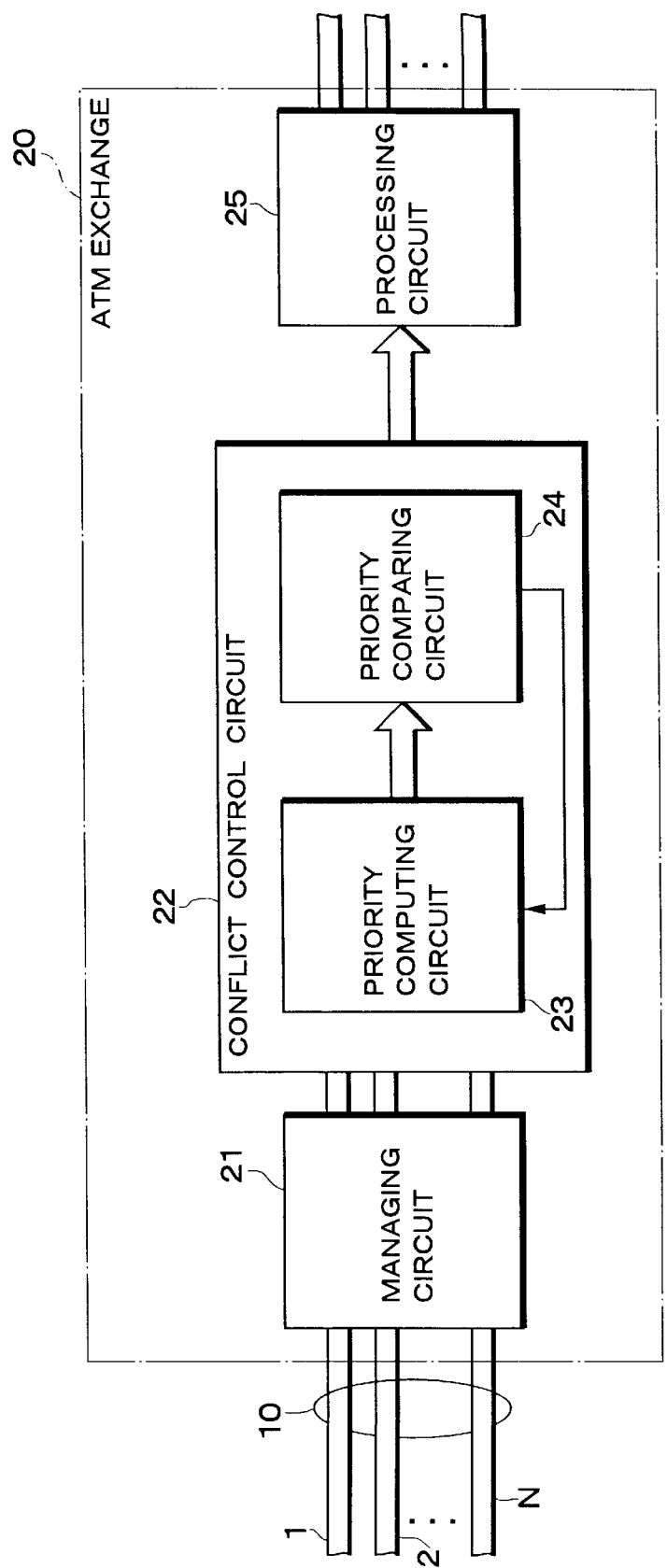
FIG. 1 is a block diagram showing the configuration of the ATM exchange according to the present invention.

In FIG. 1, between the ATM exchange 20 and an ATM exchange (not shown) that sends cells to the ATM exchange 20 is physically provided a transmission path 10 used for transmission of the cells, in which there are virtually established a plurality of connections 1–N (N denotes an arbitrary integer larger than 1.) The ATM exchange 20 incorporates the managing circuit 21, the collision control circuit 22, and the processing circuit 25. The collision control circuit 22 further incorporates the priority computing circuit 23 and the priority comparing circuit 24. The collision control circuit 22 according to this invention acts to handle or manipulate processes associated with the connections 1–N.

Herein, for ease of explanation and understanding, the meaning of several terms will be confirmed below:

(1) the "process" is defined as a process with respect to each of the plurality of connections 1–N or each of the cells passing along the connections 1–N, for example, registering in the ATM exchange 20 a variety of parameters related to each of the connections 1–N, updating those parameters, and forwarding the cells to the following ATM exchange (not shown);

(2) the "priority" is defined as the priority with respect to processes to be implemented or connections relevant to those processes, wherein priorities are updated as time proceeds;

(3) the "additional value" is defined as a value used to update each priority, wherein the additional value is added to the priority to update the priority, and depends upon conditions, e.g., the transmission rate and updating frequency in the present invention;

(4) the "transmission rate" is defined as a cell transmission rate or the bandwidth assigned to each of the connections 1–N, which may be changed as time proceeds and may be fixed; and (5) the "updating frequency" is defined as a frequency of updating the priority for each connection, wherein an updating frequency is assigned to a connection upon occurrence of the connection, where the updating frequency may be changed as time proceeds and may be fixed.

Upon occurrence of a process related to one of the plurality of connections 1–N, the managing circuit 21 recognizes the process to notify the request of the process to the collision control circuit 22. Fed the request, the priority computing circuit 23 calculates a priority of the request, which gives the priority to the priority comparing circuit 24.

Upon receipt of the priority, the priority comparing circuit 24 arranges or sorts the other requests that have arisen and the above request, in order of priority. The priority comparing circuit 24 selects among the requests, several requests that have higher priorities and can be achieved by the ATM exchange 20 in a unit process period. The selected requests, that is to say, the requests that have won the collision among the requests that have been waiting for achievement are fed to the processing circuit 25, thus being implemented according to the contents of the requests.

Hereinafter, the preferred embodiments will be now summarized. To control a collision among a plurality of processes, the first embodiment of an ATM exchange computes the priority of a process associated with a connection, on the basis of the transmission rate of the connection. In addition to the transmission rate, the second embodiment of an ATM exchange computes the priority based upon an updating frequency of the priority assigned to the connection.

The third through seventh embodiments employ a plurality of queues to control the collision. Specifically, according to those embodiments, computing the priority of a process concerning a connection is carried out on the basis of the corresponding queue. According to the third embodiment, computing the priority is carried out using the sum of the transmission rates of processes registered in the queue and an updating frequency of the priority assigned to the queue. According to the fourth embodiment, computing the priority is carried out using the number of processes registered in the queue and an updating frequency of the priority assigned to the queue. According to the fifth embodiment, computing the priority is carried out using the sum of the transmission rates of processes registered and a weight. According to sixth embodiment, computing the priority is carried out using the number of processes registered in the queue and an updating frequency assigned to the queue. According to the seventh embodiment, in lieu of computing priorities of processes, a pattern is employed which indicates the order of implementing the processes.

First Embodiment

Figure 2:
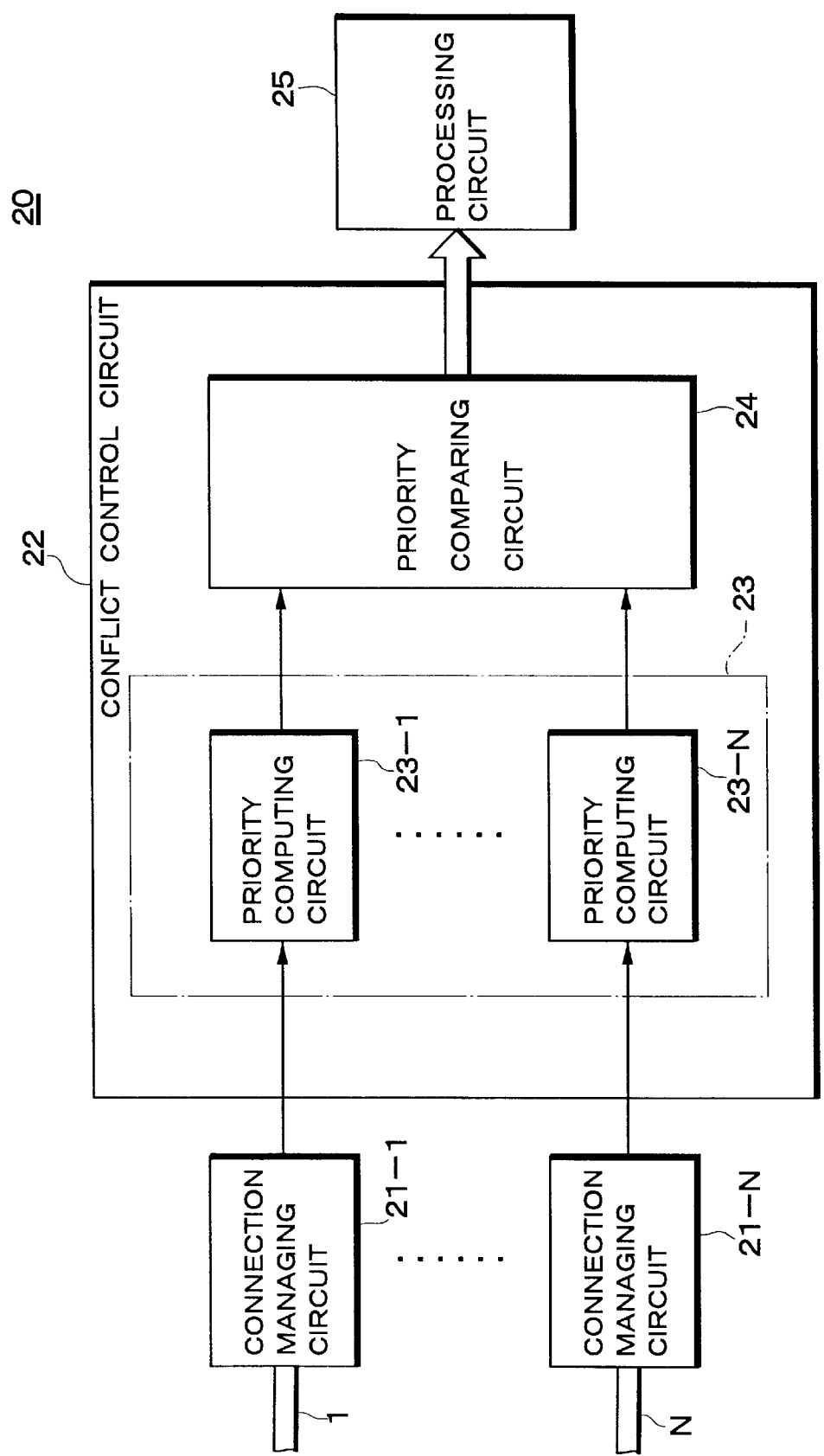
FIG. 2 is a block diagram showing the configuration of the ATM exchange according to the first and second embodiments.

The first preferred embodiment of the ATM exchange according to the present invention will be now described in detail hereinafter. In FIG. 2, the ATM exchange 20 incorporates a plurality of connection managing circuits 21-1~21-N, the collision control circuit 22, and the processing circuit 25. The collision control circuit 22 further comprises the priority computing circuit 23 and the priority comparing circuit 24. The priority computing circuit 23 includes a plurality of priority computing circuits 23-1~23-N. The plurality of connection managing circuits 21-1~21-N are respectively connected to the plurality of computing circuits 23-1~23-N, which are further connected to the priority comparing circuit 24.

The operation of the first embodiment will be discussed below. For example, upon initialization or establishment of the connection 1 or upon reset thereof, the connection 1 is given a lowest priority "0".

Thereafter, if there occurs a process in the connection 1, the connection managing circuit 21-1 notifies the priority computing circuit 23 of the request of the process. In response to notification of the request, the priority comparing circuit 23 calculates the priority of the request. Specifically, the priority computing circuit 23 calculates referring to a table shown in FIG. 3.

The table demonstrates that if the transmission rate of a connection producing a process lies between 1 and 4, the request of the process is assigned an additional value "1" for updating the priority of the request. It also demonstrates that if the transmission rate of another connection producing a process lies between 256 and 1024, the request of the process is assigned an additional value "256" that serves to make the priority of the request much higher than the additional value "1" does. To sum up, the table of FIG. 3 shows that the request concerning a connection is given an additional value according to the transmission rate of the connection, whereby the additional value is added to the priority of the request to make the priority higher. As discussed later, such an addition is carried out when a request is defeated in a collision among the requests waiting for achievement.

Executing the addition on a plurality of requests by the priority computing circuit 23 updates a plurality of priorities corresponding thereto. After computation of priorities, the priority computing circuit 23 outputs the priorities to the priority comparing circuit 24.

The priority comparing circuit 24 sorts the plurality of requests in order of priority so as to select several requests that have higher priorities and can be achieved during the unit process period by the processing circuit 25. The priority comparing circuit 24 feeds to the processing circuit 25, the selected requests, that is, the requests winning the collision among the requests waiting for achievement.

On the other hand, the priority comparing circuit 24 feeds back information indicating which request has won, to the priority computing circuit 23. Judging from the information, the priority computing circuit 23 recognizes the selected requests. Consequently, the priority computing circuit 23 resets the priorities of the connections corresponding to the selected requests, that is, sets a priority "0" to each of those connections while updating the priorities of the other remaining requests that have been defeated, that is, re-calculating the priorities in reference to the table of FIG. 3.

As described above, requests with respect to connections with larger transmission rates have stronger possibilities of winning collisions among requests waiting for achievement. Even though a request related to a connection with a larger transmission rate is defeated in a collision, its possibility of winning a following collision becomes larger because the additional value for updating the priority of the request is larger in comparison with the other requests related to connections having lower transmission rates. In short, since the priorities of processes regarding connections are proportional to the transmission rates of the connections, a process relating to a connection having a larger transmission rate can be carried out earlier than other requests relating to the other connections having smaller transmission rates. This enables avoiding extreme deterioration of the throughput of the connection having a larger transmission rate even though there exist a number of connections having smaller transmission rates.

Second Embodiment

The second embodiment of the present invention will be described hereinafter. In addition to using the transmission rate of the connection, the additional value is computed by using an updating frequency of the priority. As will be more understood, the second embodiment enables a request related to a connection having a smaller updating frequency to have updating of the priority of the request more easily.

The configuration of the second embodiment is the same as that of the first embodiment. Accordingly, the operation of the second embodiment will be principally discussed in detail below. First, similar to the first embodiment, for example, upon initialization of a connection 1 or reset thereof, the connection 1 is given a priority "0", which is the lowest. Thereafter, if there arises a process relating to the connection 1, the connection managing circuit 21-1 notifies the request of the process to the priority computing circuit 23. The priority computing circuit 23 calculates the additional value used for updating the priority, according to the transmission rate of the connection 1. Subsequently, the additional value is divided by the updating frequency assigned to the connection 1. As shown in FIG. 4, in short, roughly an additional value used for updating the priority of a process relevant to a connection is directly proportional to the transmission rate assigned to the connection and is inversely proportional to the updating frequency assigned to the connection.

Upon computing the additional value for updating the priority of the process related to the connection 1, the priority computing circuit 23 adds the additional value to the priority of the connection 1, thus updating the priority. The updated priority is fed to the priority comparing circuit 24. Similar to the first embodiment, the priority comparing circuit 24 sorts a plurality of requests in order of their priorities for selection. Consequently, the selected requests are executed by the processing circuit 25. The feedback and updating the priorities of the defeated requests are carried out similar to the first embodiment.

As described above, updating the priority of a process related to a connection on the basis of the transmission rate of the connection, the second embodiment can produce the same effect as that of the first embodiment. Besides, the additional value for use in updating the priority of a process related to a connection is determined according to the updating frequency allotted to the connection. Hence, the priority of a process relevant to a connection having a smaller updating frequency is permitted to undergo updating more frequently, while the priority of a process relevant to a connection having a larger updating frequency is permitted to under go updating less frequently. As a result, assuming that there are established such two connections having the same transmission rates but having different updating frequencies, the request of a process related to the connection having a smaller updating frequency can have a stronger possibility of winning the collision between those two connections.

Third Embodiment

Hereinafter, the third preferred embodiment of the collision control circuit in an ATM exchange according to the present invention will be discussed in detail. In contrast with the first and second preferred embodiments in which a process or a request of the process waits in the managing circuit 21, the process or a request waits in one of a plurality of queues 32-1~32-N in the third embodiment.

Figure 5:
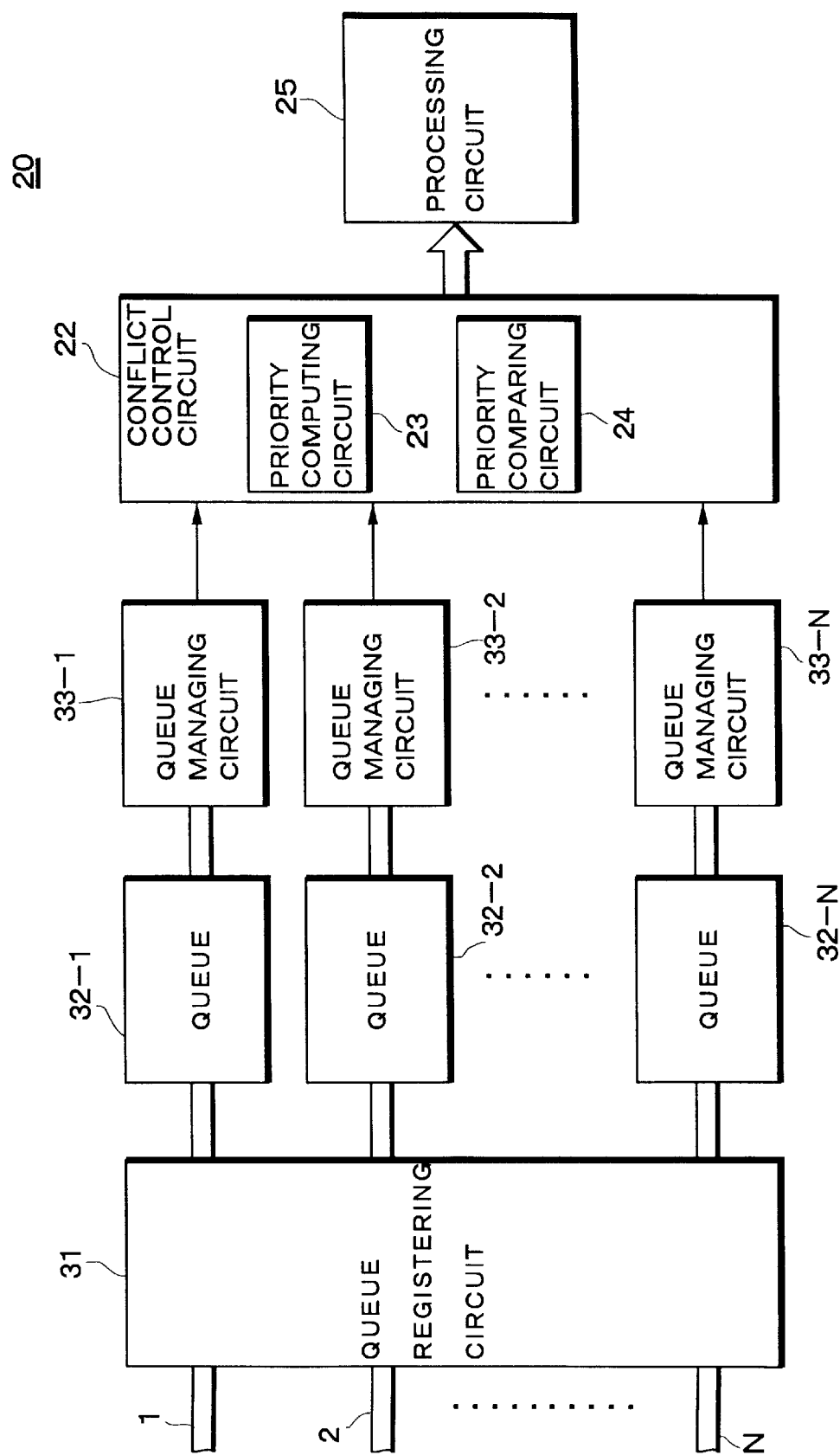
FIG. 5 is a block diagram showing the configuration of the ATM exchange according to the third and fourth embodiments.
Figure 6:
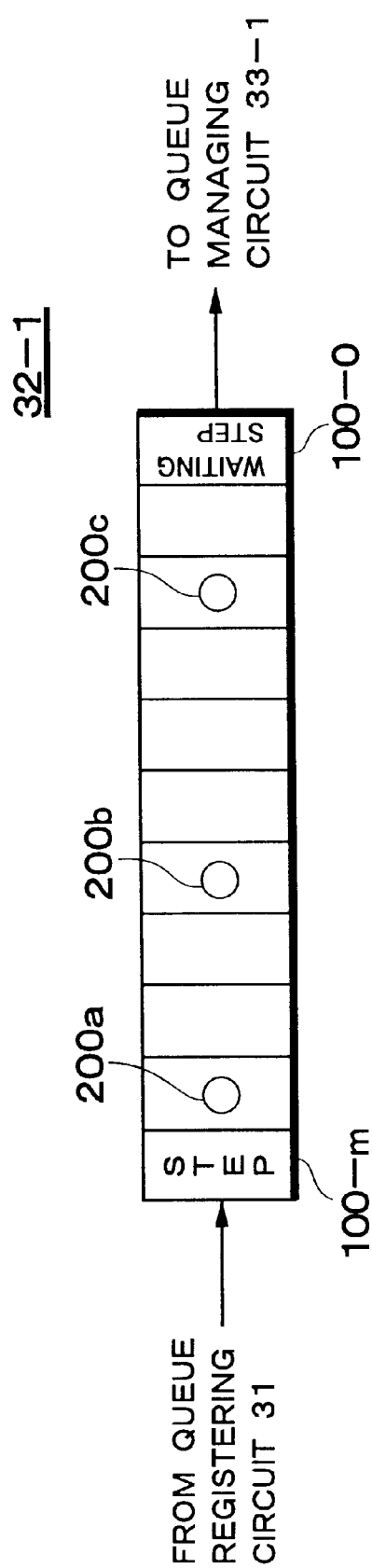
FIG. 6 is a schematic diagram showing the configuration of the queue according to the third and fourth embodiments.

As shown in FIG. 5, the ATM exchange 20 incorporates a queue registering circuit 31, a plurality of queues 32-1~32-N, a plurality of queue managing circuits 33-1~33-N, a collision control circuit 22, and a processing circuit 25. For example, as shown in FIG. 6, the queue 32-1 has a plurality of steps, which are arranged in serial. If there is established a connection and also there occurs a request with respect to the connection 1, the queue registering circuit 31 determines one of the plurality of queues 31-1~31-N, according to the updating frequency of the priority assigned to the connection 1. Further, the queue registering circuit 31 determines one of the plurality of steps in the determined queue, according to the time of period until the request will be achieved. In this way, the request is registered in the determined step of the determined queue among the plurality of queues 32-1~32-N.

The queue managing circuits 33-1~33-N measure the period of time until the request will be achieved. The measurement is carried out for each updating of a priority at a given interval. A method of registering a request in a queue and updating the queue is disclosed in U.S. patent application Ser. No. 08/3800 corresponding to Japanese Patent application No. 9-1305 by the inventor of this invention, wherein the publication is incorporated by reference herein. An explanation on updating queues will be made below.

For example, after establishment of a connection 1, once there arises a process associated with the connection 1, the process is registered in one of the plurality of queues 32-1~32-N according to the updating frequency of the priority related to the connection 1. The queue managing circuit 31 calculates at a given interval the period of time until the process will be achieved. Pursuant to the result of the calculation, the queue managing circuit 31 shifts the process from the current step to another step. Repetition of such an operation leads the process to the waiting step, e.g. 100-0. Upon arrival of the process at the waiting step, the process produces a request, which is fed into the collision control circuit 22 via the queue managing circuit 33-1 corresponding to the queue 32-1. In the collision control circuit 22, the priority comparing circuit 24 performs a collision control among a plurality of requests. This means that connections or processes related to those connections indirectly undergo a priority control through registering of the processes in the queues and updating of priorities.

Hereinbelow, an explanation on handling requests will be made. Upon occurrence of requests in several queues, the priority computing circuit 23 in the collision control circuit 22 calculates the additional value regarding the priority of each request, on the basis of the sum of transmission rates of the connections relating to the registered requests, and the updating frequencies assigned to the queues.

For the queue 32-1, for example, assuming that there are registered three processes 200a, 200b, and 200c in the queue 32-1, the priority computing circuit 23 calculates the sum of the transmission rates of the connections corresponding to the processes 200a, 200b, and 200c. Next, the priority computing circuit 23 divides the sum by the updating frequency of the queue 32-1, thus giving the additional value for the priority of the queue 32-1. In summary, the additional value is proportional to the sum of the transmission rates of the processes 200a, 200b, and 200c, and is inversely proportional to the updating frequency of the queue 32-1. The additional value is added to the priorities of the processes, whereby the priorities are updated. The updated priorities are notified to the priority comparing circuit 24. Thereafter, the priority comparing circuit 24 and the priority computing circuit 23 operate similar to in the first embodiment. As a result of controlling the collision by the priority comparing circuit 24, several queues are selected. The processes registered in the selected queues are allowed to be performed as the winners of the collision.

As described above, in contrast with the second embodiment that computes the additional value for each connection, the third embodiment computes the additional value for each queue. More definitely, a process relevant to a connection is registered in a step of a queue according to the updating frequency assigned to the connection and the period of time until the process will be executed, and also the priority of the process is calculated using the number of the transmission rates registered in the queue and the updating frequency assigned to the queue.

For a collision control among the queues, the additional value for updating the priority of the process is directly proportional to the transmission rate of the connection and is inversely proportional to the updating frequency of the queue, like the second embodiment. This therefore gives the effect similar to that of the second embodiment.

Fourth Embodiment

Hereinafter, the fourth embodiment of an ATM exchange according to the present invention will be now described. The fourth embodiment is similar to the third embodiment. The difference therebetween is the method of calculating the priority. Accordingly, calculation of the priority will be discussed in detail.

The priority computing circuit 23 enumerates the number of the processes registered in each queue to divide the number by the updating frequency of the queue, thus giving an additional value for updating the priority of the processes. The additional value is added to the priority, whereby the priority is updated. The updated priority is notified to the priority comparing circuit 24. The priority comparing circuit 24 operates similar to the third embodiment.

For example, in the case of FIG. 6, since the processes 200a, 200b, and 200c are registered in the queue 32-1, the additional value for the queue 32-1 is given by dividing the number of the processes registered in the queue by the updating frequency. To summarize the fourth embodiment, the additional value associated with a queue is directly proportional to the number of the processes registered in the queue and is inversely proportional to the updating frequency of the queue. Consequently, the fourth embodiment can give the same effect as that of third embodiment.

Fifth Embodiment

Hereinafter, the fifth preferred embodiment will be now described. The fifth embodiment features classifying the transmission rates into several groups to assign a queue for each group.

According to the fifth embodiment, the transmission rates have been categorized into several groups, wherein the ATM exchange 20 incorporates a plurality of rate queues 42-1~42-N, each representative of one of the transmission rates, and a plurality of queue managing circuits 43-1~43-N, which correspond to the plurality of rate queues 42-1~42-N, respectively. The configuration of each of the rate queues 42-1~42-N is identical with that of each of the queues 32-1~32-N in the third and fourth embodiments.

The operation of the fifth embodiment will be explained below. For example, first, the connection 1 is established, that is to say, connected to the queue registering circuit 41; thereafter, there occurs a process with respect to the connection 1. Second, the queue registering circuit 41 selects among the plurality of rate queues 42-1~42-N, a queue in which the process should be registered, according to the transmission rate of the connection 1. Further, the queue registering circuit 41 judges which of the steps in the selected queue the process should be registered in, according to the period of time until the process will be performed, which operation is similar to the above embodiments.

The queue managing circuit 43-1 manages the period of time by updating the priority of the process at a given time interval. The priority of the process is updated in proportion with the transmission rate represented by the rate queue 42-1. In other words, the process residing in a queue representative of a larger transmission rate can undergo updating of its priority more frequently.

There has been disclosed in detail a method of registering a process in a queue and updating the queue in Japanese patent application No. 9-232725, wherein the publication is incorporated by reference herein.

As described above, upon occurrence of a process in the connection 1, the process is registered in a step in one of the plurality of rate queues 42-1~42-N. Assuming that the process is registered in the rate queue 42-1, the corresponding queue managing circuit 43-1 recalculates at a given interval, the period of time until the process is performed. The queue managing circuit 43-1 shifts the queue toward the top step, namely, the step close to the exit. Repetition of such an operation finally leads the process to the top step. Reaching the top step, the process produces a request of performing the process. The request is fed into the priority computing circuit 23 in the collision control circuit 22 via the queue managing circuit 43-1.

Upon receipt of the request, the priority computing circuit 23 calculates an additional value for updating the priority, using the number of the processes registered in the rate queue 42-1 and a given weight. More specifically, the priority computing circuit 23 counts the number of the processes registered in the queue 42-1. For example, in the case of FIG. 6, the number is counted to be three. Further the priority computing circuit 23 gives the weight to the number to obtain an additional value. Herein, the weight for a rate queue representing a larger transmission rate is so set as to be larger.

Updating the priority by the priority computing circuit 23 is carried out once per collision control. The above request experiences a collision control when the time comes that updating the priority of the queue 42-1 is carried out. Thereafter, the priority comparing circuit 24 and the priority computing circuit 23 operate similar to the first embodiment. In this way, as a result of a collision control performed by the priority comparing circuit 24, several rate queues among the plurality of rate queues 42-1~42-N are selected. For the selected rate queues, the corresponding processes are carried out as winners of the collision.

As described above, when a process with respect to a connection occurs, the process is registered in a rate queue in accordance to the transmission rate of the connection while the priority of the process is proportional to the transmission rate represented by the rate queue. Therefore, since a process with respect to a connection having a larger transmission rate is registered in a rate queue denoting a higher priority, the process has a stronger possibility of winning a collision. Even though the process is defeated, the process has a stronger possibility of winning a following collision because an updated priority of the process increases in proportion to the transmission rate represented by the rate queue. In this way, the priority of a process is proportional to the transmission rate represented by the rate queue in which the process is laid; hence, even though there may occur a large number of collisions due to an increase of connections, it is possible to avoid an extreme deterioration of the throughput of connections having larger transmission rates. Moreover, each rate queue experiences weighting. This enables a collision control having a smaller possibility of yielding an imbalance among a plurality of connections or processes separated according to transmission rate.

Sixth Embodiment

Figure 7:
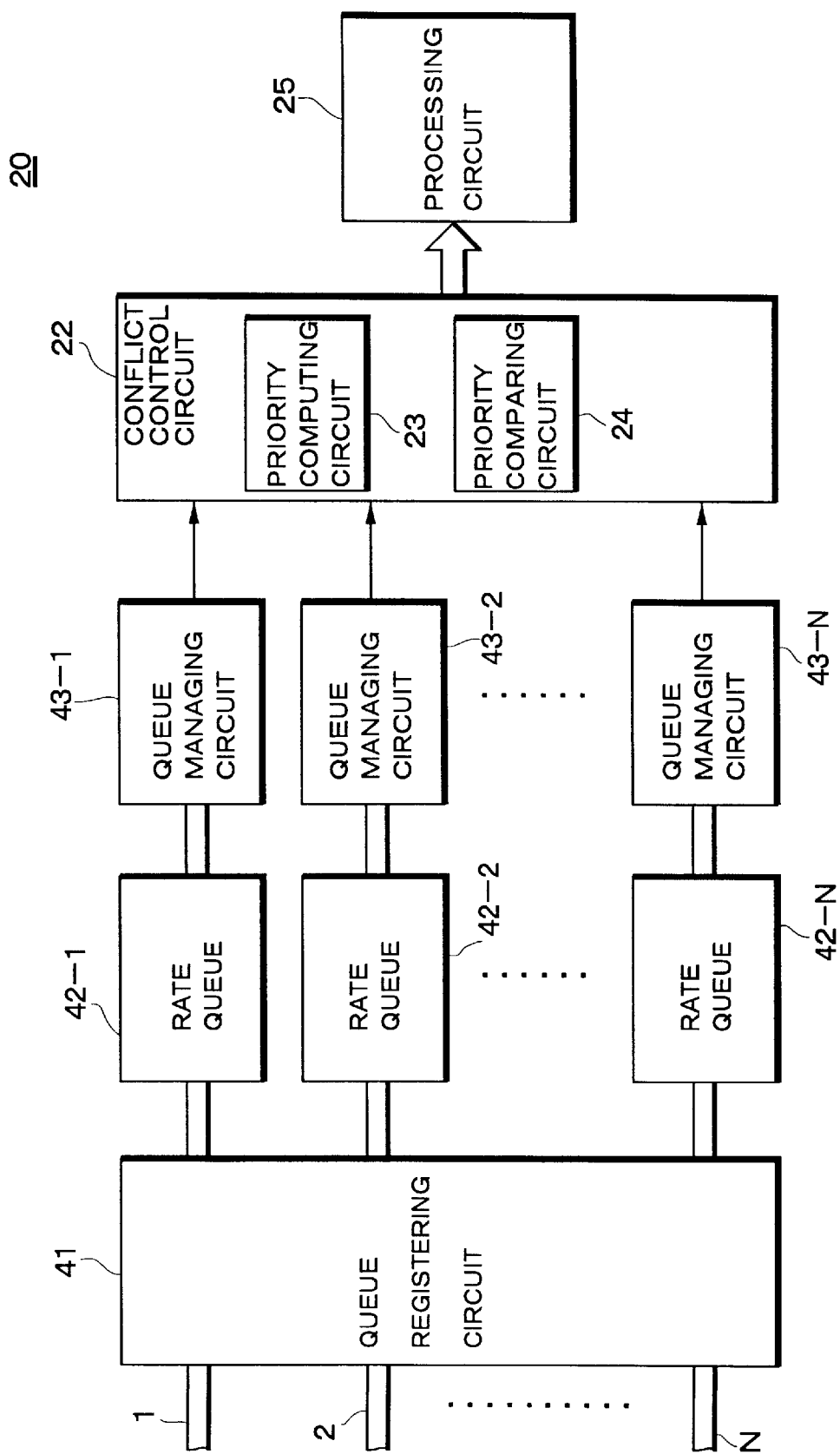
FIG. 7 is a block diagram showing the configuration of the ATM exchange according to the fifth and sixth embodiments.

Hereinafter, the sixth embodiment of an ATM exchange according to the present invention will be now described with reference to FIG. 7. The configuration and operation of the sixth embodiment are the same as those of the fifth embodiment. The difference between them is how to compute the priority of a process. More specifically, the updating of the priority of a process registered in a rate queue is approximately proportional to the transmission rate represented by the rate queue. In short, a process residing in a rate queue representative of a larger transmission rate experiences updating of its priority more frequently.

Assuming that a process is registered in the rate queue 32-1, the priority computing circuit 23 computes the additional value for updating the priority of the process. First, the priority computing circuit 23 counts the number of the processes registered in the rate queue 32-1. Second, the priority computing circuit 23 weighs the number using a given weight to give the additional value used for updating the process. Herein, a weight for an additional value is proportional to the transmission rate represented by the rate queue and is inversely proportional to the updating frequency of the rate queue.

Upon occurrence of a request of the process registered in a rate queue, the request undergoes a collision control when the time comes that the priority of the process is updated. Thereafter, the priority comparing circuit 24 and the priority computing circuit 23 operate like the first embodiment. As a result of a collision control performed by the priority comparing circuit 24, several processes are selected, whereby the selected processes are carried out as winners of the collision.

As described above, the sixth embodiment can give the same effect as that of the fifth embodiment. Further, since updating frequencies of priorities can be freely designed, collision controls can be efficiently and effectively carried out.

Seventh Embodiment

Figure 8:
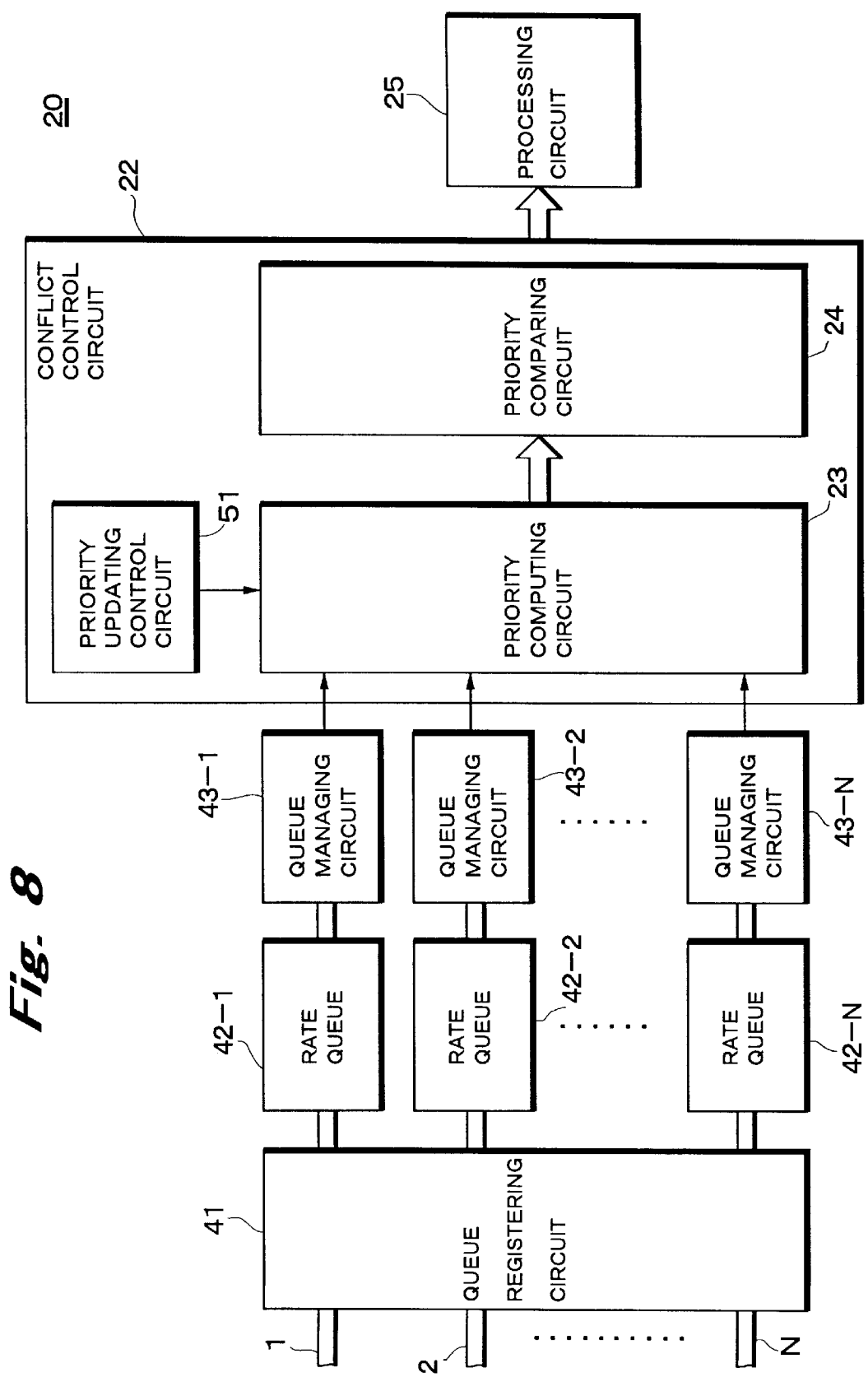
FIG. 8 is a block diagram showing the configuration of the ATM exchange according to the seventh embodiment.

Hereinbelow, the seventh embodiment of an ATM exchange according to the present invention will be described referring to FIGS. 8 and 9. The seventh embodiment is almost identical with the sixth embodiment in configuration and operation. Differing from the sixth embodiment, the seventh embodiment further incorporates the priority updating control circuit 51. The priority updating control circuit 51 manages the timing of updating.

Similar to the sixth embodiment, each of the rate queues 42-1~42-N is individually allotted an updating frequency. The priority updating control 51 prepares a pattern of timing at which the priorities of queues are updated. Pursuant to the pattern, the priority updating control circuit 51 notifies the timing of updating to the priority computing circuit 23.

For example, it is assumed that the rate queues are such that transmission rates are separated double-wise, while the rate queue 42-1 has the largest transmission rate and the rate queue 42-N has the smallest transmission rate. The rate queue 42-1 is also of registered processes with respect to the connection having the largest transmission rate. The rate queue 42-N undergoes updating of priorities one time every process cycle.

The rate queue 42-2, in which are registered processes with respect to a connection having a transmission rate smaller than that of the above connection, experiences updating of priorities one time every two process cycles. The rate queue 42-3, in which are registered processes with respect to a connection having a transmission rate further smaller than that of this connection, experiences updating of priorities once every four process cycles. The other rate queues experience updating of priorities likewise.

Upon preparation of the pattern which indicates the timing of updating priorities as shown in FIG. 9, the processes are multiplexed pursuant to the pattern. Specifically, on the basis of the transmission rates represented by the rate queues 42-1~42-N, a pattern indicative of allocation of the processes in the process cycle is prepared. According to the pattern, the updating for the rate queue 42-1 is performed every process cycle, the updating for the rate queue 42-2 is performed every two process cycles, the updating for the rate queue 42-3 is performed every four process cycles, the updating for the rate queue 42-4 is performed every eight process cycles, and the updating for the rate queue 42-5 is performed every sixteen process cycles, as shown in FIG. 9.

As described above, according to the seventh embodiment, a pattern is prepared that denotes the allotment of the timing of updating the priorities to the process cycle, wherein performing the updating of the priorities by using the pattern simplifies computing and comparing of the priorities.

In the above embodiment, the transmission rate of a rate queue is two times as large as that of the adjacent smaller rate queue. Instead of two times, n times may be available, wherein timings of updating priorities are allotted similarly to the case of two times.

Preparing such a pattern is available to a plurality of queues having the same transmission rates, and also is available to a plurality of queues separated according to updating frequency. In the latter case, a pattern that indicates timing of updating priorities is prepared in advance, wherein each of the plurality of queues is allotted an updating frequency of priorities pursuant to the pattern.

While the present invention has been described in terms of the preferred embodiments, the invention is not to be limited thereto, but can be embodied in various ways without departing from the principle of the invention as defined in the appended claims.

What is claimed is:

1. An ATM exchange in which a plurality of connections are established and a plurality of processes arise with respect to the plurality of connections, each having a transmission rate, the ATM exchange comprising:

a priority computing circuit which computes a priority of a process according to a transmission rate assigned a connection to which the process is associated;

a priority comparing circuit which compares a plurality of priorities corresponding to the plurality of processes to select a process having a higher priority among the plurality of processes;

a processing circuit which carries out the selected process; and a managing circuit that recognizes a process relating to one of the plurality of connections and provides notification of a process request to the priority computing circuit wherein the managing circuit comprises:

a queue registering circuit coupled to the plurality of connections and recognizing processes from the plurality of connections;

a plurality of queues, to one of which the queue registering circuit assigns a particular process; and a plurality of queue managing circuits, each associated with one of the plurality of queues, updating the queue, and providing requests from the queue to the priority computing circuit.

2. The ATM exchange according to claim 1, wherein each of the plurality of queues comprises a plurality of steps; wherein the queue registering circuit assigns a process to a particular step in a particular queue; and wherein the queue managing circuit associate with a particular queue shifts processes from step to step within the queue.

3. The ATM exchange according to claim 1, wherein the priority computing circuit further computes a priority of a process based on an updating frequency of the priority.

4. The ATM exchange according to claim 1, wherein the priority comparing circuit provides feedback indicating a selected process to the priority computing circuit.

5. The ATM exchange according to claim 1, wherein each of the plurality of queues comprises a rate queue, and wherein the queue registering circuit assigns processes to queues according to their associated transmission rates.

6. The ATM exchange according to claim 5, wherein priority of a process residing in a queue corresponding to a higher transmission rate has its priority updated more often than the priority of a process residing in a queue corresponding to a lower transmission rate.

7. The ATM exchange according to claim 5, wherein each of the plurality of queues comprises a plurality of steps; wherein the queue registering circuit assigns a process to a particular step in a particular queue; and wherein the queue managing circuit associate with a particular queue shifts processes from step to step within the queue.

8. The ATM exchange according to claim 5, further comprising:

a priority updating control circuit that manages the timing of updating of priorities by the priority computing circuit.

* * * * *

UNITED STATES PATENT AND TRADEMARK OFFICE
CERTIFICATE OF CORRECTION

PATENT NO.        : 6,683,879 B1                                              Page 1 of 1
APPLICATION NO.   : 09/258370
DATED             : January 27, 2004
INVENTOR(S)       : Youiti Kado It is certified that error appears in the above-identified patent and that said Letters Patent is hereby corrected as shown below:

Column 7, line 26, "Ser. No. 08/3800" should be "Ser No. 09/003,800"

Signed and Sealed this

Eighteenth Day of November, 2008

JON W. DUDAS
*Director of the United States Patent and Trademark Office*